United States Patent Office.

ARTHUR EICHENGRÜN AND THEODOR BECKER, OF ELBERFELD, GERMANY, ASSIGNORS TO FARBENFABRIKEN OF ELBERFELD CO., OF NEW YORK, N. Y., A CORPORATION OF NEW YORK.

PHOTOGRAPHIC DEVELOPER AND PROCESS OF MAKING SAME.

SPECIFICATION forming part of Letters Patent No. 703,243, dated June 24, 1902.

Application filed July 17, 1901. Serial No. 68,676. (Specimens.)

*To all whom it may concern:*

Be it known that we, ARTHUR EICHENGRÜN and THEODOR BECKER, doctors of philosophy, chemists, residing at Elberfeld, Germany, (assignors to the FARBENFABRIKEN OF ELBERFELD CO., of New York,) have invented a new and useful Photographic Developer and Process of Making Same; and we hereby declare the following to be a clear and exact description of our invention.

We have found that new products of addition from polyhydroxyl derivatives of aromatic bodies can be obtained by the action of these compounds—such as pyrogallol, pyrocatechin resorcin, or the like—on aliphatic or nitrogen bases, such as methylamin, dimethylamin, or the like. The process for preparing these compounds can be carried out by melting a mixture of equimolecular proportions of the two components or by causing the same to react on each other in the presence of a suitable solvent, such as water, alcohol, benzene, or the like. The new bodies thus obtained are crystalline compounds, soluble in water, which possess an alkaline reaction. By the action of caustic alkalies they are split up into their components. The new bodies will be used as photographic developers.

In carrying out the new process practically we can proceed as follows, the parts being by weight: A watery solution of one hundred and twenty-six parts of pyrogallol is added to two hundred and twenty-five parts of a twenty-per-cent. solution of dimethylamin and the resulting mixture is then allowed to stand at the ordinary temperature, a contact with the air being avoided the while. After some time the liquid becomes hot spontaneously, a precipitate of large prisms being separated in the mixture. When the reaction is finished, the precipitate is filtered off, contact with the air being avoided. The new additional product, having the formula

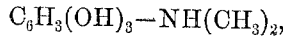

is a crystalline powder. It is easily soluble in water, soluble with difficulty in alcohol, and insoluble in ether. It has the melting-point 163° centigrade.

The process proceeds in an analogous manner if other aliphatic amins are employed, such as trimethylamin, monomethylamin, or the like. Other phenols or derivatives thereof containing several hydroxy groups react in an analogous manner—such as resorcin, pyrocatechin, phenolcarboxylic acids, or the like.

The additional product obtained from resorcin and dimethylamin melts at 82° centigrade. The additional compound produced from dimethylamin and pyrocatechin melts at 115° centigrade. The compound obtained from dimethylamin and the methylic ether of gallic acid melts at 164° centigrade. The dimethylaminethylic ether of this acid melts at 79° centigrade and free from water at about 122° centigrade, while the combination dimethylamin-gallacetophenone has the melting-point 156° centigrade.

Having now described our invention and in what manner the same is to be performed, what we claim as new, and desire to secure by Letters Patent, is—

1. The process for producing new products of addition from polyhydroxyl derivatives of the benzene series which process consists in first treating these compounds with nitrogen bases of the aliphatic series and then isolating the resulting bodies from the reaction mixture, substantially as hereinbefore described.

2. The process for producing a new product of addition being pyrogallol-dimethylamin of the formula:

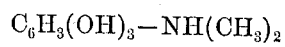

by first treating pyrogallol with dimethylamin and then isolating the new compound from the reaction mixture, substantially as hereinbefore described.

3. The herein-described new products of addition from polyhydroxyl derivatives of the benzene series with nitrogen bases of the aliphatic series which are crystalline substances, soluble in water and possessing an alkaline reaction, being split up into their components by the action of caustic alkalies, substantially as hereinbefore described.

4. The herein-described pyrogallol-dimethylamin having the formula:

$$C_6H_3(OH)_3-NH(CH_3)_2$$

which is a crystalline powder melting at 163° centigrade which is easily soluble in water, soluble with difficulty in alcohol and insoluble in ether, substantially as hereinbefore described.

In testimony whereof we have signed our names in the presence of two subscribing witnesses.

ARTHUR EICHENGRÜN.
THEODOR BECKER.

Witnesses:
J. A. RITTERSHAUS,
A. SCHADDE, Jr.